Figure 1:
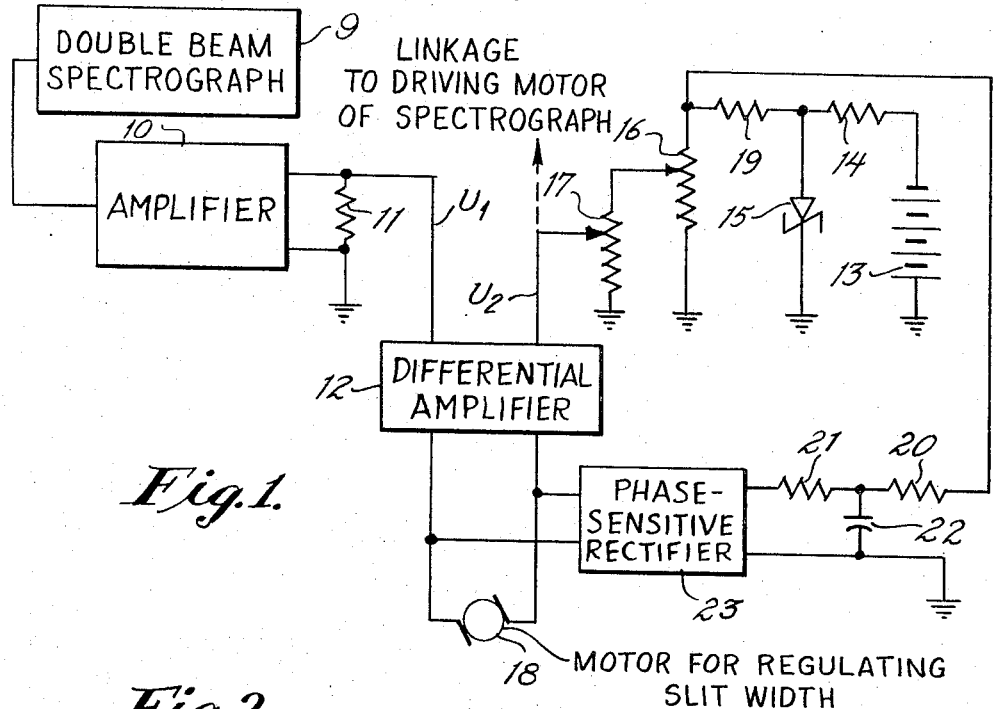

United States Patent Office 3,359,472
Patented Dec. 19, 1967

3,359,472
AUTOMATIC GAIN CONTROL SYSTEM FOR DOUBLE-BEAMED SPECTROGRAPH
Helmuth Frenk and Dieter Huelsmann, Wetzlar (Lahn), Germany, assignors to Ernst Leitz G.m.b.H., Wetzlar (Lahn), Germany, a corporation of Germany
Filed Apr. 20, 1964, Ser. No. 361,010
6 Claims. (Cl. 318—26)

This invention relates to an automatic control system for spectrographs.

A technique is known for controlling the voltage proportional to the intensity $I_0$ of the unattenuated reference beam which is produced in double-beam spectrographs empolying optical matching and derivation of a voltage proportional to the intensity $I$ of the measuring beam and equal to the product $a \times I_0$, where $a$ represents the transmissivity of the specimen. This known technique involves the multiplication of the fixed reference value $I_0$ corresponding to the intensity of the unattenuated reference beam by the factor $a$ proportional to the displacement of the attenuator mechanism to form a new reference value $a \times I_0$ which is then compared with the measured value $I$ corresponding to the intensity of the measuring beam. Apparatus for using this technique includes a source of a signal representing the measured quantity, a differential amplifier controlling a servomotor, a potentiometer for selecting the value of $I_{0\ reference}$, and a potentiometer which compensates for voltage variations caused by changes in the transmissivity of the specimen under study. The last-mentioned potentiometer has one of its fixed terminals connected to the sliding contact of the reference-selecting potentiometer. Both potentiometers exhibit linear resistance characteristics.

It has been observed that, under certain circumstances, variations in the input level can cause undesirable noticeable variations in the control quantity. This control quantity, which is the product of $I_0$ and a factor $a$, may cause oscillations in the control system when $a$ approaches 100%. On the other hand, for small values of $a$, the system may already be overdamped. These difficulties can be avoided by operating the control action at low speed only and by operating the control system only to the minimum value where $a$ falls below 5%. Such restrictions on the operations of the control system evidently limit the range of uses for the equipment.

It is an object of the present invention to modify the known system in such a way as to eliminate the above-noted restrictions on its uses.

It is another object to add to said described system additional apparatus which frees it from said restrictions.

These and other objects which will appear are achieved in accordance with the invention by deriving from the output of the differential amplifier forming part of the control system in question not only a control signal for the servomotor of the system, but also a unidirectional potential which is then superposed upon that potential from which the reference value of $I_0$ is selected. In a preferred embodiment of the invention the output of the differential amplifier is connected to a phase-sensitive rectifier, sometimes also referred-to as a phase detector, whose output is connected to an R-C network, which is in turn connected via a resistor to that fixed terminal of the reference selecting potentiometer which is closest to the power supply.

In an alternative form of the invention, a generator whose output voltage varies with speed, sometimes referred to as a tacho-generator, driven by the servomotor is used in place of the above-described phase detector, R-C network and resistor.

Figure 2:
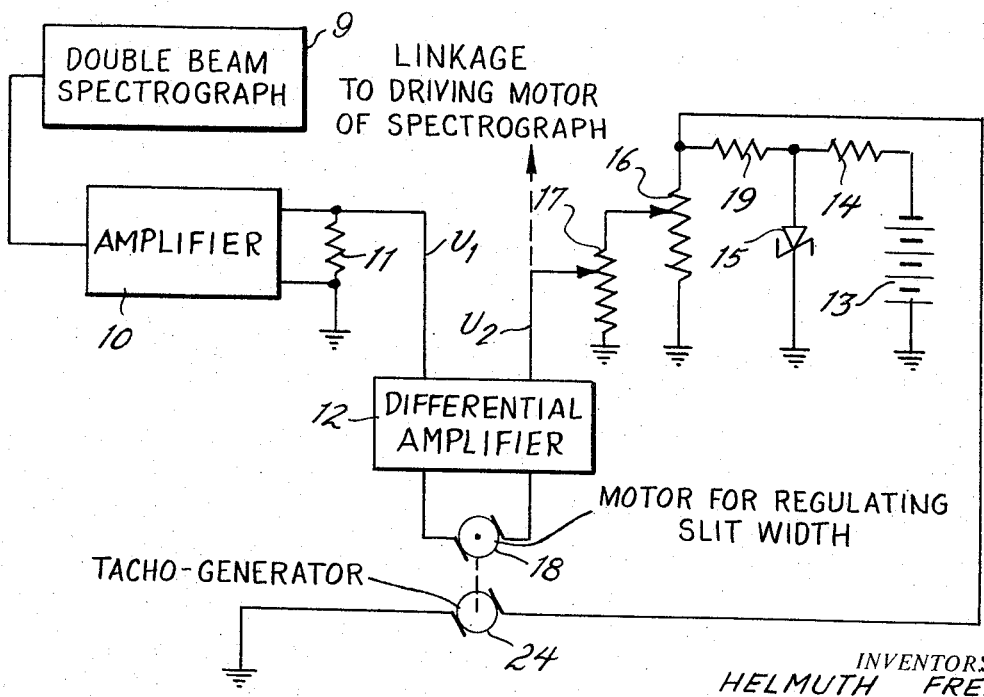

For further details reference is made to the discussion which follows and to the accompanying drawings wherein FIGURE 1 is a combined block and circuit diagram illustrating the preferred embodiment of the invention, and FIGURE 2 is a similar diagram illustrating the above-mentioned alternative embodiment.

The same reference characters are used in both figures to denote corresponding parts.

In FIGURE 1, to which reference may now be had, reference character $U_1$ designates the potential representing the measured value $I_{atcual}$. This potential is produced within a spectrograph 9 of the type under consideration in a manner which is well known in the art and need therefore not be further described. Potential $U_1$ is applied via amplifier 10 to a resistor 11 connected to one input of a differential amplifier 12, which is thereby supplied with a potential representing the measured intensity $I_{actual}$. A potential $U_2$, which is applied to the second input of amplifier 12, is derived from a power supply 13, across which there are connected in known manner a resistor 14 and a zener diode 15 in series-parallel relation. Across the zener diode there is connected the series combination of a decoupling resistor 19 and a linear potentiometer 16, by means of whose sliding contact there may be selected, in known manner, a desired potential proportional to the reference intensity $I_{0\ reference}$. The sliding contact of this potentiometer is connected to one fixed terminal of a second linear potentiometer 17, these two potentiometers being thereby interconnected in what may be described as a cascade arrangement.

The sliding contact of potentiometer 17 is connected directly to the driving motor for the light attenuator mechanism and the recording drum of the spectrometer. This sliding contact is therefore displaced in proportion to the variations in the displacement $a$ of the light attenuator mechanism. Thus there is achieved a multiplication of the reference intensity $I_{0\ reference}$ by the quantity $a$ proportional to displacement.

The potential so obtained is therefore proportional to the product $a \times I_{0\ reference}$, which equals $I_{reference}$. This latter quantity can be directly compared in amplifier 12 with the quantity proportional to the measured $I_{actual}$. To the output of amplifier 12 there is connected a motor 18, which regulates the slit width and/or the gain of the instrument.

The output of amplifier 12 is also applied to the input terminals of a phase-sensitive rectifier, or phase detector 23, whose output is, in turn, applied to an R-C network 21, 22, which latter is connected via resistor 20 to the junction of resistor 19 and potentiometer 16.

In accordance with the invention, components 20 through 23 provide a feedback path by means of which oscillations occuring at high values of $a$ are suppressed. To this end the output signal from amplifier 12 is phase detected, and then filtered by the R-C network which is proportioned in known manner to exhibit a time constant corresponding to the mechanical response time of the motor 18. Thus there is produced a unidirectional potential proportional to speed which is subtractively combined with the unidirectional difference potential between potentiometer 17 and resistor 11. According to the invention the feedback potential is fed in ahead of the two potentiometers 16, 17, thus the feedback factor is subject to the same voltage division as the quantity $a \times I_0$. Consequently, the relationship between the feedback factor and the over-all gain remains constant and so does the damping characteristic. The system therefore functions satisfactorily for large and small values of $a$.

It should also be noted that in lieu of the output potential of amplifier 12, there may be applied to the input terminals of the rectifier a potential proportional to the said output potential, without adverse effect on the feedback.

The operation of FIGURE 1, in the absence of components 20 through 23, is described in German Patent No. 1,157,406, granted Nov. 14, 1963. As pointed out in that patent, this operation can be illustrated by the following example.

First, if we assume that the actual value of $I_0$ remains unchanged during a complete measuring cycle and if, during this cycle, the value of $a$ falls from 90% to 10% and then rises again to 80%, the potential developed across resistor 11, which corresponds to the value of $I_{actual}$, may for example, also fall from 900 mv. to 100 mv., following which it rises again to 800 mv. Throughout, the unmeasured value of $I_0$ would be 1000 mv., which equals 1 volt.

Dealing still with this example, let the potentiometer 16 be adjusted so that the reference value of $I_0$ developed at the upper end of potentiometer 17 equals 1 volt. The sliding contact of this potentiometer is then also displaced by the recording mechanism of the instrument from its 90% (=900 mv.), via the 10% (=100 mv.), to the 80% (=800 mv.) position. Consequently the difference between the potentials applied to the two different inputs of amplifier 12 always remains zero.

If on the other hand the actual value of $I_0$ had changed during exploration of the spectrum or because of line voltage variations, so that it had become 900 mv. instead of 1000 mv., then at 90% the actual value of I as measured across resistor 11 would be only 810 mv. instead of 900 mv., at 10% only 90 mv. instead of 100 mv., and so forth. Between the inputs of amplifier 12 a potential difference varying from 90 to 10 and then to 80 mv. would then be developed.

In accordance with the present invention, the output of this amplifier is utilized to not only control motor 18, but to also produce, by means of components 20 through 23 or their functional equivalents as herein described, a potential which is fed back in subtractive, or degenerative relation to the source of the potential applied across potentiometer 16. This tends to suppress undesired effects which might otherwise occur.

Referring now to FIGURE 2, the apparatus shown therein differs from that of FIGURE 1 only in that the components 20 through 23 of the latter are absent and instead the desired feedback in accordance with the invention is achieved by means of a tacho-generator 24 driven by the motor 18 and having its electrical output connected to the junction of resistor 19 and potentiometer 16.

Still other embodiments will occur to those skilled in the art without departing from the present inventive concept whose scope is defined in the appended claims.

The claimed invention:
1. An automatic gain control system for a double-beamed spectrograph, said spectograph including
    a source of a reference potential consisting of the series combination of a resistor and potential source shunted by a zener diode,
    a source of a measured potential,
    a differential amplifier controlling a servomotor,
    a first linear potentiometer to compensate for potential variations arising from transmissivity changes arising from a specimen when examined in said spectrograph,
    said potentiometer having a linear resistance characteristic and having one fixed terminal connected to the sliding contact of a second linear potentiometer and having one grounded fixed terminal,
    said first potentiometer having its slide contact connected to an input connection of said amplifier,
    said second potentiometer having a first fixed terminal grounded and having a second fixed terminal connected via a resistor to said source of a reference potential,
    said differential amplifier having its input derived from said reference potential and said measured potential,
    said control system being characterized in that the output of said differential amplifier is connected to the input of a phase-sensitive rectifier,
    the output of said rectifier is connected to an R-C network,
    and said R-C network is also connected by means of a resistor to said second fixed terminal of said second potentiometer.

2. A double-beam spectrograph system comprising: means for deriving a first electrical signal representing the potential measured by said spectrograph; means for deriving a second electrical signal from a source of potential; differential amplifier means providing an output signal; means for supplying said derived signals to different inputs of said amplifier to produce said output signal; said means for deriving a second electrical signal comprising first and second linear potentiometers connected together in cascade with said source and the first of said potentiometers being connected to an input to said amplifier; means for feeding back to the second of said potentiometers a unidirectional signal derived from the output signal produced by said amplifier and for subtractively combining said unidirectional signal with the electrical signal from said source.

3. The system of claim 2 characterized in that said feedback means comprises a phase detector supplied with said output signal of said amplifier, an R-C network connected to said detector, and a coupling resistor connected to said R-C network.

4. The system of claim 3 further comprising a servomotor controlled by said amplifier output signal, and characterized in that said R-C network is proportioned to exhibit a time-constant proportioned to correspond to the mechanical response time of said motor.

5. The system of claim 3 wherein one fixed terminal of said second linear potentiometer is connected through a first resistor to a zener and to a second resistor connected in turn to said potential source and the coupling resistor is connected between said R-C network and said fixed terminal.

6. The system of claim 2 characterized in that said means for feeding back said unidirectional signal comprises a motor driven by said output signal, and a tacho-generator driven by said motor.

References Cited

UNITED STATES PATENTS

| | | | |
|---|---|---|---|
| 2,167,484 | 7/1939 | Berry | 318—20 |
| 2,722,156 | 11/1955 | Warren | 88—14 |
| 2,984,149 | 5/1961 | Herscher et al. | 88—14 |
| 2,887,642 | 4/1959 | Ehret et al. | 318—448 |

FOREIGN PATENTS 1,157,406   11/1963   Germany.

BENJAMIN DOBECK, *Primary Examiner.*

A. D. PELLINEN, *Assistant Examiner.*